United States Patent
Wang

(10) Patent No.: US 8,724,794 B2
(45) Date of Patent: May 13, 2014

(54) APPARATUS AND METHOD FOR PROVIDING CUSTOMIZED INFORMATION

(75) Inventor: Jun Wang, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1694 days.

(21) Appl. No.: 11/645,773

(22) Filed: Dec. 27, 2006

(65) Prior Publication Data

US 2007/0127705 A1   Jun. 7, 2007

Related U.S. Application Data

(63) Continuation of application No. PCT/CN2006/001872, filed on Jul. 27, 2006.

(30) Foreign Application Priority Data

Aug. 19, 2005   (CN) .......................... 2005 1 0093221

(51) Int. Cl.
  *H04M 5/00*   (2006.01)
  *H04M 13/00*   (2006.01)

(52) U.S. Cl.
  USPC .......................................... 379/252; 379/179

(58) Field of Classification Search
  USPC ............. 379/207.02, 88.22, 373.01; 455/406, 455/414.1, 550.1, 466
  See application file for complete search history.

(56) References Cited

U.S. PATENT DOCUMENTS

| | | | |
|---|---|---|---|
| 6,807,574 B1 | 10/2004 | Partovi et al. | |
| 2001/0044297 A1 * | 11/2001 | Myer et al. | 455/412 |
| 2004/0102163 A1 | 5/2004 | Seki | |
| 2004/0142718 A1 * | 7/2004 | Kim | 455/550.1 |
| 2004/0174983 A1 * | 9/2004 | Olschwang et al. | 379/377 |
| 2005/0101262 A1 | 5/2005 | Lee et al. | |
| 2006/0264225 A1 * | 11/2006 | No et al. | 455/458 |
| 2007/0003040 A1 * | 1/2007 | Radziewicz et al. | 379/211.01 |
| 2007/0129115 A1 * | 6/2007 | Kuroda | 455/567 |
| 2008/0002824 A1 * | 1/2008 | No et al. | 379/418 |
| 2008/0268821 A1 * | 10/2008 | Koskela | 455/414.1 |

FOREIGN PATENT DOCUMENTS

| | | |
|---|---|---|
| CN | 1488229 A | 4/2004 |
| CN | 1536919 A | 10/2004 |
| CN | 1617618 A | 5/2005 |
| CN | 1852362 A | 10/2006 |

(Continued)

OTHER PUBLICATIONS

Written Opinion of the International Searching Authority dated Dec. 14, 2006 in connection with International Patent Application No. PCT/CN2006/001872.

(Continued)

*Primary Examiner* — Fan Tsang
*Assistant Examiner* — Solomon Bezuayehu

(57) ABSTRACT

An apparatus for providing customized information, including: a control unit used for sending a trigger signal to a play unit upon receiving a call request from a caller terminal, an information storage unit used for storing the customized information, and a play unit used for sending the customized information obtained from the information storage unit to the caller terminal. A method for providing customized information, including: obtaining and storing the customized information by the called terminal, and sending the customized information stored to the caller terminal by the called terminal upon receiving a call request from the caller terminal.

21 Claims, 3 Drawing Sheets

(56) References Cited

FOREIGN PATENT DOCUMENTS

| | | | | |
|---|---|---|---|---|
| EP | 0939535 | A | 9/1999 | |
| EP | 1408711 | A1 * | 4/2004 | ............... H04Q 7/38 |
| EP | 1408711 | A1 | 4/2004 | |
| EP | 1517527 | A | 3/2005 | |
| EP | 1517527 | A1 * | 3/2005 | ............ H04M 3/487 |
| KR | 10-2004-0110214 | | 12/2004 | |
| TW | 550931 | A | 9/2003 | |
| WO | 0062524 | | 10/2000 | |
| WO | WO 03/009632 | A1 | 1/2003 | |
| WO | 2004054282 | A2 | 6/2004 | |
| WO | 2004095817 | A1 | 11/2004 | |
| WO | 2004107722 | A1 | 12/2004 | |

OTHER PUBLICATIONS

Office Action dated Jan. 31, 2008 in connection with Korean Patent Application No. 10-2007-7002057.

Translation of Office Action dated Jul. 24, 2009 in connection with Chinese Patent Application No. 200680011932.X.

Translation of Office Action dated Jan. 23, 2009 in connection with Chinese Patent Application No. 200680011932.X.

Translation of Office Action dated Apr. 18, 2008 in connection with Chinese Patent Application No. 200510093221.9.

* cited by examiner

APPARATUS AND METHOD FOR PROVIDING CUSTOMIZED INFORMATION

CROSS-REFERENCE TO RELATED APPLICATIONS

This is a continuation of International Application No. PCT/CN2006/001872, filed on Jul. 27, 2006, which designated the United States; the disclosure of which is hereby incorporated by reference in its entirety.

FIELD OF THE TECHNOLOGY

The present invention relates to the communication service technology, and more particularly, to an apparatus and a method for providing customized information.

BACKGROUND OF THE INVENTION

When making a phone call in the conventional voice communication service, a caller will only hear monotonous bell rings before the call is picked up. After a Ring Back Tone (RBT) service came into the market, according to the RBTs customized by the called terminal, the caller may hear music, songs, stories, dialogues, etc., instead of the monotonous bell rings, which largely increases the customer's experience satisfaction.

The implementation of RBT service in the prior art is comparatively complex, in which the existing communication devices on the network side need to be improved and some new communication devices need to be added to the network side, for instance, a Home Location Register (HLR) and a Mobile Switching Center (MSC) need to be improved and a RBT Server (RBTS) needs to be added. Moreover, the system has to manage multiple communication devices working in collaboration, which makes the information interaction rather complex as well, and it is especially far from fully satisfying the users' demand for customization that the RBTs are usually provided by content providers currently so that the user may choose among limited types and quantities of RBTs provided at the designated locations.

SUMMARY OF THE INVENTION

Embodiments of the present invention provide an apparatus and a method for providing customized information to satisfy users' demand without adding communication device to the network side.

The apparatus for providing customized information, includes a control unit, a play unit and an information storage unit;

the control unit is used for sending a trigger signal to a play unit, upon receiving a call request;

the play unit is used for requesting the customized information from an information storage unit, and sending the customized information to the caller terminal, upon receiving the trigger signal; and the information storage unit is used for storing the customized information, and sending the customized information to the play unit according to the request from the play unit.

The apparatus further includes:

a format conversion unit which is used for receiving the customized information inputted externally, converting format of the customized information inputted externally into a designated transmission format, and sending customized information converted to the information storage unit.

The control unit is further used for sending a stop playing signal to the play unit when detecting that the called user answers; and the play unit terminates a process of sending the customized information to the caller terminal upon receiving the stop playing signal.

The control unit is further used for determining a customized information selection parameter, upon receiving the call request, searching for a customized information identity which corresponds to the customized information selection parameter according to a relation between the customized information selection parameters and the customized information identities stored in the control unit, and sending the customized information identity to the play unit; and upon receiving the customized information identity, the play unit obtains the customized information that corresponds to the customized information identity from the information storage unit and sends the customized information to the caller terminal.

The control unit is further used for sending a customized information identity which is set to be a background sound to the play unit when detecting that the called user answers, or sending both the customized information identity which is set to be the background sound and a play-for-the-called signal to the play unit; and the play unit is further used for obtaining the customized information that corresponds to the customized information identity from the information storage unit and sending the customized information to the caller terminal, upon receiving the customized information identity; and upon receiving the play-for-the-called signal, sending the customized information to a speaker of the called terminal.

The control unit is further used for storing a sound effect parameter adjustment condition and a standard sound effect parameter and sending the standard sound effect parameter to the play unit upon detecting that the sound effect parameter adjustment condition is met; and the play unit is further used for adjusting the customized information sent according to the sound effect parameter, upon receiving the standard sound effect parameter.

The apparatus further includes:

a charging unit which is used for charging the customized information according to the customized information identity, and charging for a call upon receiving a call response from the called terminal.

A method for providing customized information, includes:

sending the customized information stored in a called terminal to a caller terminal, upon receiving a call request from the caller terminal.

The customized information includes at least one of voice information, video information and graphic information.

Sending the customized information to the caller terminal includes:

sending the customized information to the caller terminal via a path that supports a customized information transmission from the called terminal to the caller terminal.

The method further includes the process of:

setting the called terminal in an automatic connected state; and sending the customized information to the caller terminal including:

sending the customized information to the caller terminal via a bidirectional communication link between the called terminal and the caller terminal.

The method further includes the process of:

terminating a process of sending the customized information to the caller terminal upon the called terminal detects that the called user answers.

The method further includes the process of:

sending the customized information which is set to be a background sound to the caller terminal and/or the called terminal upon the called terminal detects that the called user answers.

The called terminal stores a sound effect adjustment condition and a standard sound effect parameter, the method further includes the process of:

adjusting the customized information sent according to the sound effect parameter stored in the called terminal, upon the called terminal detects that the sound effect parameter adjustment condition is met.

Sending the customized information to the caller terminal includes:

determining the customized information selection parameter, searching for the customized information corresponding to the customized information selection parameter according to a relationship between the customized information selection parameters and the customized information, and sending the customized information to the caller terminal, in which the relationship is stored in the called terminal.

The customized information selection parameter includes at least one of a caller terminal identity, period of calling time and location of the called terminal during the calling.

Sending the customized information to the caller terminal includes:

sending the customized information and the customized information identity to a Visited Mobile Switching Center (VMSC) through a Mobile Switching Center (MSC);

sending the customized information to the caller terminal, notifying a charging unit to charge for the customized information according to the customized information identity and to charge for a call upon receiving a call response from the called terminal.

The method further includes the process of:

subscribing for call wait services other than the customized information service as well as the customized information service at the same time to a Home Location Register (HLR) by the called terminal, setting and storing a customized information transmission condition by the called terminal;

sending the customized information to the caller terminal including:

sending the customized information to the caller terminal when the called terminal detects that the customized information transmission condition is met.

The customized information transmission condition includes at least one of a designated caller terminal identity, a designated period of time and a designated location of the called terminal.

Compared with the apparatus and method in the conventional art, the apparatus provided by an embodiment of the present invention achieves the objective of providing the caller terminal with customized information through adding an information storage unit and a play unit in the called terminal; the method provided by an embodiment of the present invention achieves the objective of satisfying users' demand, without adding communication device to the network side, through sending the customized information stored in the called terminal to the caller terminal upon receiving a call request from the caller terminal by the called terminal. Furthermore, the called terminal may subscribe to the HLR for a customized information service in order to utilize the management and charging functions of the MSC.

DETAILED DESCRIPTION OF PREFERRED EMBODIMENTS

Figure 1:
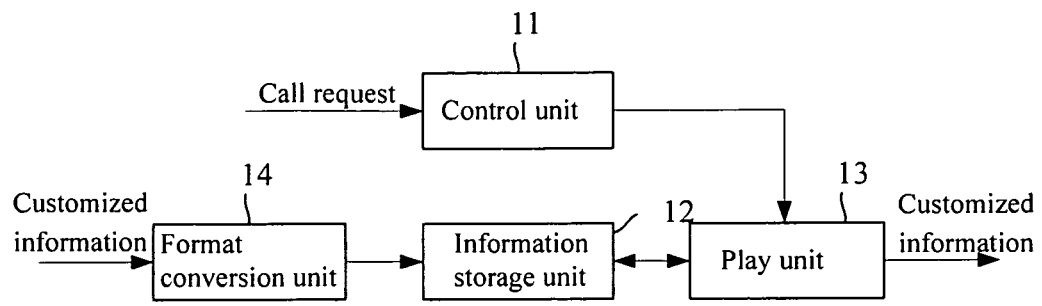
FIG. 1 is a block diagram illustrating an apparatus for providing customized information in accordance with an embodiment of the present invention.

FIG. 1 is a block diagram illustrating an apparatus for providing customized information in accordance with an embodiment of the present invention. The apparatus includes:

a control unit 11, used for sending a trigger signal to a play unit, upon receiving a call request sent by a caller terminal.

The control unit 11 is further used for storing a corresponding relation between a customized information selection parameter and a customized information identity, determining customized information selection parameter upon receiving the call request from the caller terminal, searching in the control unit for the customized information identity that corresponds to the customized information selection parameter and sending the customized information identity and the trigger signal to a play unit 13.

The customized information selection parameter includes one or any combination of the caller terminal identity, period of calling time, and location of a called terminal during the calling different parameters correspond to different customized information.

The control unit 11 is further used for sending a stop playing signal to the play unit 13 when detecting that the called user answers.

The control unit 11 is further used for storing the customized information identity which is set to be a background sound in advance and determining whether the customized information has been set to be a background sound upon detecting that the called user answers; taking no action if current customized information has been set to be a background sound, if current customized information hasn't been set to be a background sound, sending a stop playing signal to the play unit 13 or sending a customized information identity which is set in advance to be a background sound to the play unit 12.

The control unit 11 is further used for, after determining that current customized information has been set to be a background sound, or while sending a customized information identity which is set in advance to be a background sound to the play unit 13, sending a play-for-the-called signal to the play unit 13.

The control unit 11 is further used for, after determining that the customized information has been set to be a background sound, or while sending a customized information identity which is set in advance to be a background sound to the play unit 13, sending a play-only-for-the-called signal to the play unit 13.

The control unit 11 is further used for storing a standard sound effect parameter and a sound effect parameter adjustment condition including a sound volume, a tone, and etc., and sending the standard sound effect parameter to the play unit 13 when detecting that the sound effect parameter adjustment condition is met.

The control unit 11 is further used for setting and storing a customized information transmission condition in advance if the called terminal has subscribed to the customized information service and other call wait services, and verifying whether the customized information transmission condition is met upon receiving a call request from the caller terminal; if the customized information transmission condition is met upon receiving a call request from the caller terminal, sending a trigger signal to the play unit 13, if the customized information transmission condition is not met upon receiving a call request from the caller terminal, informing the MSC that the control unit will not send the customized information to the caller terminal.

An information storage unit 12 is used for storing the customized information that may be transmitted in the communication network in which the caller terminal and the called terminals are located and sending the customized information to the play unit 13 upon receiving the trigger signal from the play unit 13.

The customized information includes one or any combination of voice information, video information and graphic information; the called terminal may restrict the format and the capacity of the customized information. The customized information may be obtained through the following two ways:

1. downloading from websites of content providers or personal computers;
2. recording customized information by the called terminal and storing in the information storage unit 12.

The information storage unit 12 may choose any customized information to be sent to the play unit 13 when nothing but a trigger signal from the play unit 13 is received.

The information storage unit 12 is further used for receiving the customized information identity sent alone or together with the trigger signal by the play unit 13 and sending the customized information that corresponds to the customized information identity to the play unit 13.

The play unit 13 is used for sending a trigger signal to the information storage unit 12 upon receiving the trigger signal from the control unit 11, receiving the customized information exported by the information storage unit 12 and sending the customized information to the caller terminal.

The play unit 13 is further used for sending the trigger signal and the customized information identity to the information storage unit 12 upon receiving the customized information identity sent by the control unit 11 together with the trigger signal; or sending the customized information identity to the information storage unit 12 upon receiving the customized information identity sent by the control unit 11.

The play unit 13 is further used for terminating the process of sending the customized information to the caller terminal when the stop playing signal is received from the control unit 11.

The play unit 13 is further used for sending current customized information to a speaker of the called terminal, upon receiving the play-for-the-called signal from the control unit 11.

The play unit 13 is further used for terminating the process of sending the customized information to the caller terminal and sending the customized information to the speaker of the called terminal, upon receiving the play-for-the-called only signal from the control unit 11.

The play unit 13 is further used for, upon receiving the standard sound effect parameter from the control unit 11, adjusting the sound effect of the customized information currently sent according to the parameter.

The apparatus further includes a format conversion unit 14, used for receiving the customized information inputted from exterior, converting the format of the information into the designated transmission format supported by the communication network in which the caller and the called terminals are located, and sending the customized information converted by the format conversion unit 14 to the information storage unit 12.

Figure 2:
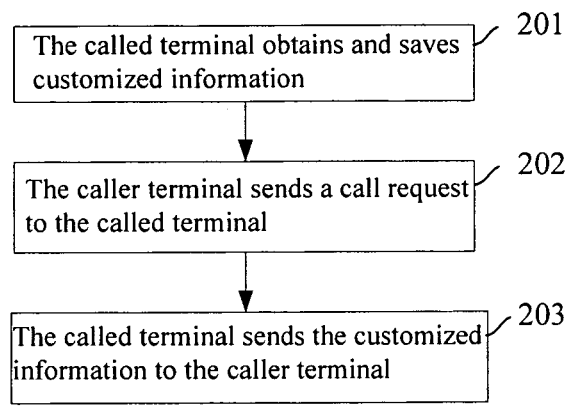
FIG. 2 is a flow chart of providing customized information in accordance with an embodiment of the present invention.

FIG. 2 is a flow chart for providing customized information in accordance with an embodiment of the present invention. As shown in FIG. 2, the process includes the process of:

201: the called terminal obtains and stores the customized information;

202: the caller terminal sends a call request to the called terminal;

203: upon receiving the call request, the called terminal sends the customized information stored in the called terminal to the caller terminal while notifying the called user of the call request through ringing or vibration.

The called terminal may be set in an automatic answer mode, which means a bidirectional communication link is established between the caller and the called terminals promptly upon receiving the call request and the customized information is sent to the caller terminal right after the conversation link is established; or the called terminal subscribes to the HLR in advance, agreeing with the HLR that only a unidirectional path that supports only the customized information transmission from the called terminal to the caller terminal is established upon receiving the call request and the customized information is sent to the caller terminal through the path, while a bidirectional communication link is established between the caller terminal and the called terminals upon the response of the called user.

Figure 3:
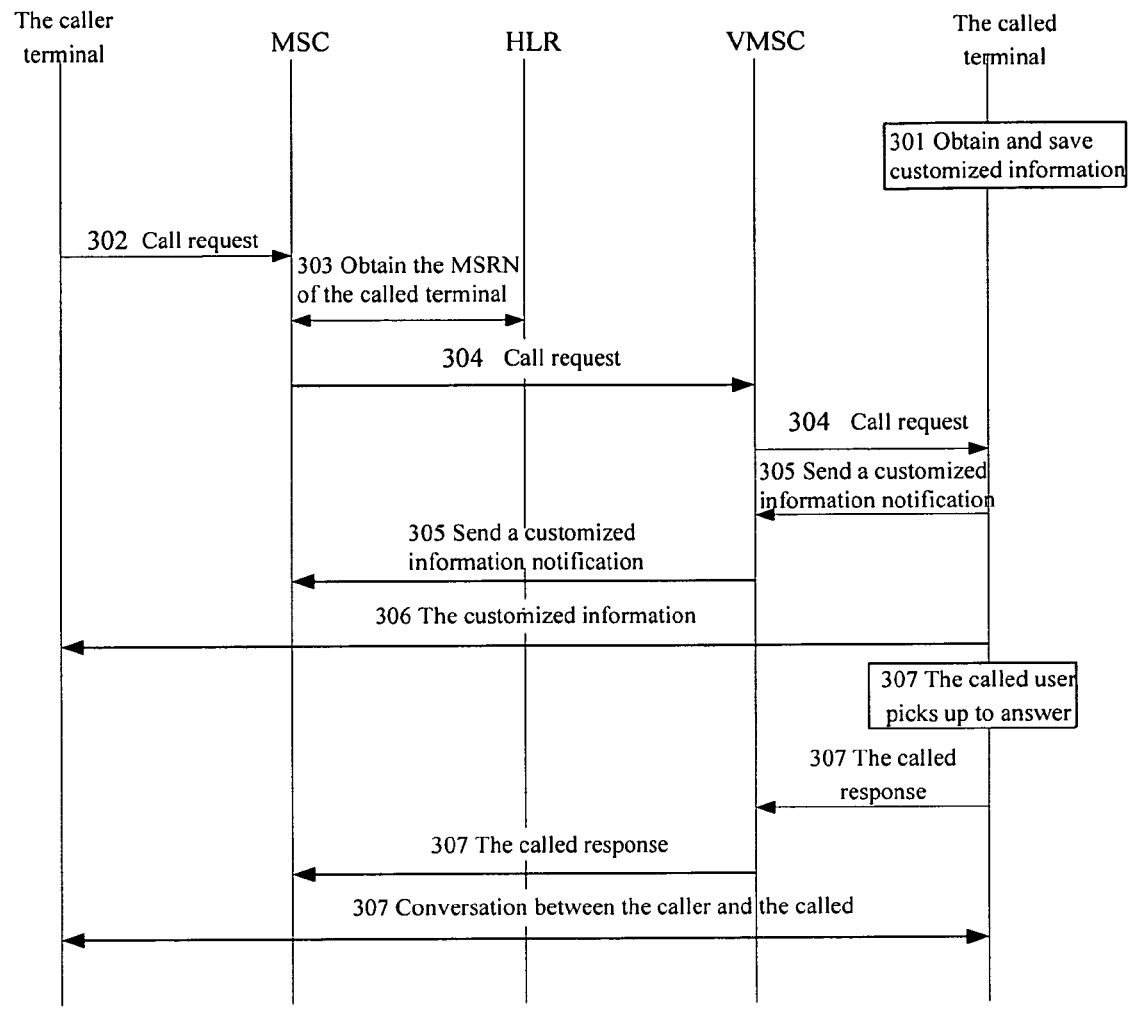
FIG. 3 is a message sequence diagram for providing customized information in one embodiment of the present invention.

FIG. 3 is a message sequence diagram for providing customized information in Embodiment 1 of the present invention. In this embodiment, the called terminal may provide customized information by itself, but has not subscribed to the HLR to either the customized information service or the RBT service. As shown in FIG. 3, the embodiment includes the process of:

301: the called terminal obtains and stores the customized information;

302: the caller terminal initiates a call request to the called terminal through an MSC; the call request carries at least a Mobile Directory Number (MDN) of the called terminal;

303: upon receiving the call request, the MSC acquires the HLR of the called terminal from the MDN of the called terminal, and obtains a Mobile Station Roaming Number (MSRN) of the called terminal from the HLR of the called terminal;

304: the MSC forwards the call request to a Visited Mobile Switching Center (VMSC) of the called terminal according to the MSRN of the called terminal; upon receiving the call request and when the called terminal is detected to be idle, the VMSC forwards the call request to the called terminal;

If the called terminal is detected to be busy, e.g., is in a conversation, when the VMSC receives the call request, the VMSC sends a called terminal non-idle notification to the MSC; upon receiving the called terminal non-idle notification, the MSC forwards the called terminal non-idle notification to the caller terminal; the caller terminal releases the call upon receiving the called terminal non-idle notification and terminates the process;

305: upon receiving the call request, the called terminal notifies the VMSC that the called terminal will send the customized information to the caller terminal, and the VMSC forwards the notification to the MSC upon receiving the notification;

306: the called terminal sends the customized information to the caller terminal;

The called terminal may set up a list of corresponding relation between the customized information selection parameter and the customized information in advance, so as to play different customized information for the caller terminal in different circumstances; the customized information selection parameter includes one or any combination of the caller terminal identity, period of calling time, and location of the called terminal during the calling, for instance, the called terminal may divide the caller terminals into three groups including a friends & colleagues terminal group, a girl friend group and a strangers group, the identity of each group corresponds to different customized information, upon receiving a call request, corresponding customized information will be searched out according to the caller terminal identity carried by the call request and be sent to the caller terminal; the strangers group may correspond to none of the customized information; or the called terminal may divide calling time period into an office hour and a leisure hour, each of which corresponds to different customized information; or the called terminal may divide its locations into local locations and roaming locations, each of which corresponds to different customized information;

The called terminal may send the customized information in the automatic mode, which includes the processes of setting the called terminal in the automatic response mode, which means, a bidirectional communication link to the caller terminal will be established promptly after the receipt of a call request by the called terminal and the customized information will be sent through the link to the caller terminal; the called terminal may send the customized information in a push-button mode, which includes the processes of setting up a customized information sending button in the called terminal, and upon receiving a call request and when detecting that the user has pressed the button, establishing a bidirectional communication link to the caller terminal by the called terminal and sending the customized information through the link to the caller terminal;

307: After detecting that the called user answers, the called terminal sends a called response to the VMSC; upon receiving the called response, the VMSC forwards the called response to the MSC which in turn forwards the called response to the caller terminal; when the caller terminal receives the called response, the conversation between the caller and the called user begins.

After detecting that the called user answers, the called terminal may terminate process of sending the customized information to the caller terminal. Alternatively, it may continue to send the customized information as the background sound to the caller terminal. At this point the called terminal may adjust the contents of the customized information to provide the caller terminal with pleasant background sounds. For instance, the called terminal may set part of the customized information stored in the called terminal as background sounds in advance. When the called user answers, the called terminal terminates the process of sending the customized information and chooses another piece of customized information which is set to be a background sound in advance to send to the caller terminal, or the called terminal firstly verifies whether the customized information has been set to be a background sound, and continues sending if current customized information has been set to be a background sound. If current customized information has not been set to be a background sound the called terminal chooses another piece of customized information which has been set to be a background sound in advance to send to the caller terminal.

When the customized information is sent to the caller terminal as a background sound, the called terminal may play the customized information to the called user with the speaker of the called terminal at the same time; or when the called terminal detects that the called user answers, the called terminal terminates the process of sending the customized information to the caller terminal while continuing sending the customized information as a background sound to the called terminal.

Before or during the process of sending the customized information by the called terminal, the called terminal may adjust the sound effect parameter including parameters on sound volume and tone. The sound effect parameter may be adjusted in the automatic mode, which includes the processes of: storing the sound effect parameter adjustment condition and the standard sound effect parameter by the called terminal, adjusting the sound effect parameter to the standard value when detecting that the sound effect parameter adjustment condition is met, where the sound effect parameter adjustment condition may includes: the sound volume is larger or smaller than a certain value; the sound effect parameter may be adjusted in the push-button mode, which includes the processes of: setting up a sound effect parameter adjustment button in the called terminal and adjusting the sound effect of current customized information by the called terminal according to corresponding sound effect parameter of the button when detecting that the button has been pushed by the called user.

Figure 4:
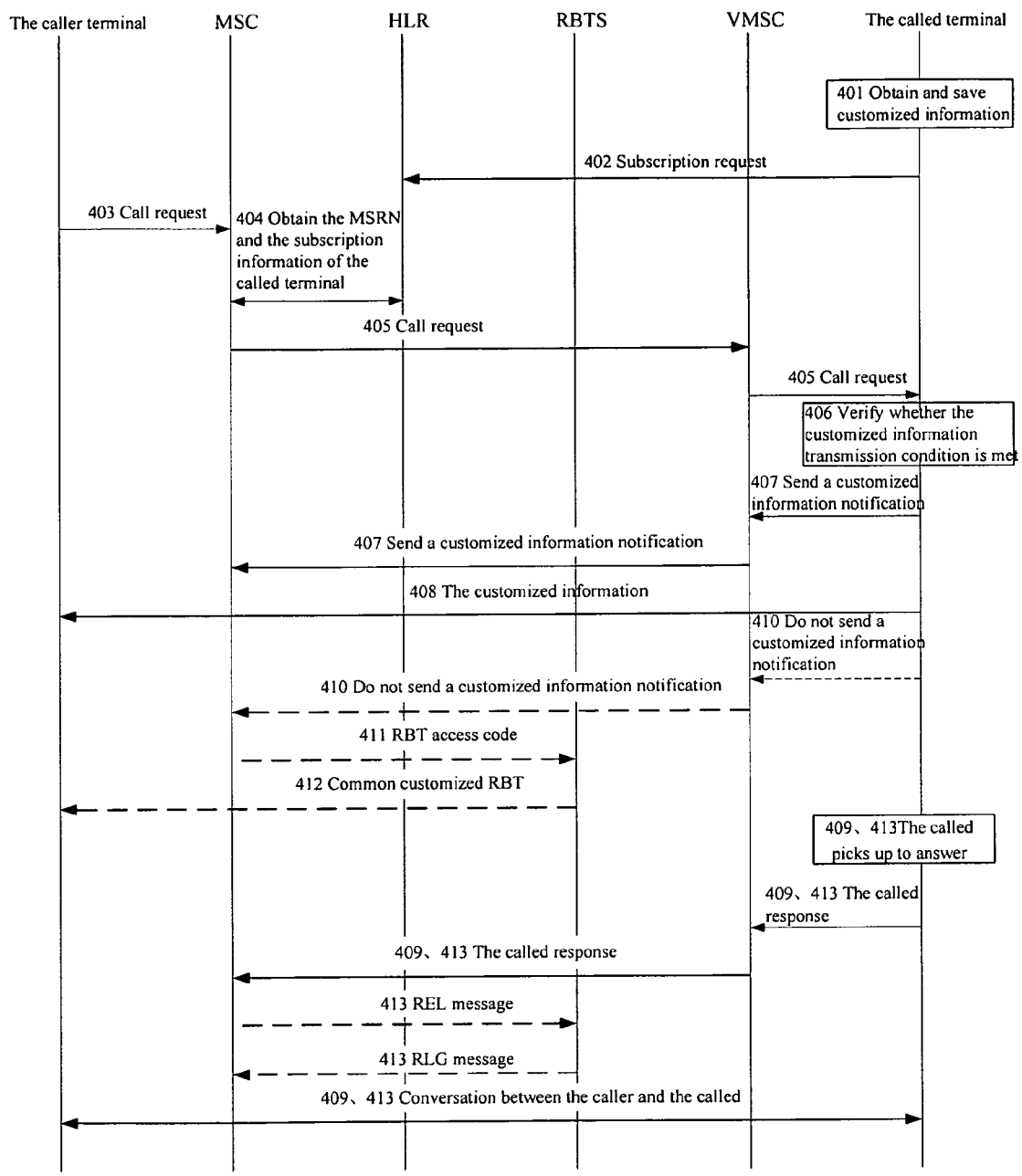
FIG. 4 is a message sequence diagram for providing customized information in another embodiment of the present invention.

FIG. 4 is a message sequence diagram for providing customized information in another embodiment of the present invention. In this embodiment, the called terminal may provide customized information by the called terminal. And the called terminal has subscribed to the HLR to both the customized information service and the RBT service. As shown in FIG. 4, the embodiment includes the processes of:

401: the called terminal obtains and stores the customized information;

402: the called terminal sends a subscription request to the HLR to subscribe to the customized information service and the RBT service; upon receiving the request, the HLR stores a record that the called terminal has subscribed to the customized information service and the RBT service;

403: a caller terminal initiates a call request to the called terminal through the MSC, and the call request carries at least the MDN of the called terminal;

404: upon receiving the call request, the MSC acquires the home HLR of the called terminal from the MDN of the called terminal, obtains the MSRN and subscription information of the called terminal from the HLR of the called terminal, acquires from the subscription information that the called terminal has subscribed to both the customized information service and the RBT service and acquires a RBT access code of the called terminal in the RBTS at the same time;

405: the MSC forwards the call request to the VMSC of the called terminal according to the MSRN of the called terminal; upon receiving the call request and when the called terminal is detected to be idle, the VMSC forwards the call request to the called terminal;

If the called terminal is detected to be busy, e.g., is in a conversation, when the VMSC receives the call request, the VMSC sends a called terminal non-idle notification to the MSC; upon receiving the notification, the MSC forwards the notification to the caller terminal; the caller terminal releases the call upon receiving the notification and terminates the process;

406: upon receiving the call request, the called terminal determines whether the customized information transmission condition is met according to the customized information transmission condition stored in the called terminal; if the condition is met, the process of 407 is performed, otherwise the process of 410 is performed;

The customized information transmission condition may be set by the called terminal in advance; the condition may include one or any combination of the caller terminal identity, period of calling time, and location of the called terminal during the calling. For instance, when the caller terminal is a non-stranger terminal, the customized information is sent, and when the caller terminal is a stranger terminal, the RBT customized by the RBTS is sent; or when it is in the leisure hour, the customized information is sent, and when it is in the office hour, the RBTS is notified to send a RBT; or when the called terminal is in the local area, the customized information will be sent, and when the called terminal roams to another area, the RBTS is notified to send a RBT;

407: the called terminal sending a notification to the VMSC indicating that the called terminal will send the customized information to the caller terminal; upon receiving the notification, the VMSC forwards the notification to the MSC;

:the called terminal sends the customized information to the caller terminal;

Similarly, corresponding relation between the customized information selection parameter and the customized information may be set in advance; and different customized information is chosen according to the customized information selection parameter when a piece of customized information is to be sent;

When the called terminal subscribes to the HLR, it agrees that a unidirectional path that only supports the transmission of the customized information is established to the caller upon receiving a call request, thus the called terminal may send the customized information to the caller terminal through the unidirectional path and establishes a bidirectional communication link to the caller terminal when detecting that the called user answers;

409: after detecting that the called user answers, the called terminal sends a called response to the VMSC; upon receiving the called response, the VMSC forwards the called response to the MSC which in turn forwards it to the caller terminal; when the caller terminal receives the called response, the conversation between the caller and the called user begins and the present process is terminated;

Similarly, when detecting that the called user answers, the called terminal may terminate the process of sending the customized information to the caller terminal, or alternatively, the called terminal may continue to send the customized information as the background sound to the caller terminal;

410: the called terminal sends a notification to the VMSC indicating that the called terminal will not send the customized information to the caller terminal; upon receiving the notification, the VMSC forwards the notification to the MSC;

411: upon receiving the notification, the MSC accesses the RBTS according to the RBT access code and sends another notification to the RBTS indicating the addresses of the caller and the called terminals;

412: upon receiving the notification indicating the addresses of the caller and the called terminals, the RBTS sends the RBT customized by the called terminal to the caller terminal;

413: when the called terminal detects that the called user answers, the called terminal sends a called response to the VMSC; upon receiving the called response, the VMSC forwards the called response to the MSC; when the MSC receives the called response, the MSC sends a Release (REL) message to the RBTS; upon receiving the Release message, the RBTS releases the guard over the call and sends a Release Guard (RLG) message to the MSC; upon receiving the RLG message, the MSC establishes the conversation link between the caller terminal and the called terminals and the conversation between the caller user and the called user begins.

In this embodiment the called terminal needs to subscribe to the HLR to send the customized information, which brings at least the following advantages: after receiving the call request sent by the caller terminal, the VMSC acquires from the subscription information of the called terminal which is obtained from the HLR that: the called terminal has subscribed to the customized information service, so that the VMSC may abandon the default wait mode such as the ring, in order to prevent the time lag caused by the VMSC's sending the default call wait mode and the customized information simultaneously to the caller terminal, and to facilitate the customization of the charging strategy for the customized information service by the HLR.

It should be noted that in the embodiments of the present invention, a path that supports the transmission of the customized information from the called terminal to the caller terminal should be established before the called terminal sends the customized information to the caller terminal, in such a case, if the called terminal does not subscribe to the HLR for the customized information service, according to the conventional charging method, the network side will charge for the customized information transmitted through the path, which may prevent some users from providing the customized information service. Different charging strategies may be set for the customized information service to solve such a problem properly:

Strategy 1. The called terminal inquires the charging methods of the caller terminals in advance and stores the identities of the caller terminals which adopt the monthly payment mode. When a call request from a caller terminal is received, the called terminal firstly verifies whether the caller terminal corresponding to the caller terminal identity carried in the call request adopts the monthly payment mode, if the caller terminal that corresponds to the caller terminal identity carried in the call request adopts the monthly payment mode, the called terminal sends the customized information to the caller terminal, if the caller terminal corresponding to the caller terminal identity carried in the call request does not adopt the monthly payment mode, the called terminal notifies the VMSC to send the default call wait method or notifies the RBTS to send a RBT customized by the called terminal.

Strategy 2. The strategy is adopted in the situation where the called terminal has subscribed to the HLR for the customized information service, agreeing with the HLR that, while sending the customized information, the called terminal should notify the VMSC that the information is a piece of customized information by means of, for example, attaching a special identity to the customized information; upon receiving the notification indicating that the information is a piece of customized information, the VMSC sends a no charging message to a charging unit until the VMSC receives a called response from the called terminal, then the VMSC notifies the charging unit to start charging for the conversation.

Only an unidirectional communication is allowed in such situation, in other words, the called terminal is allowed to send the customized information to the caller terminal while the caller terminal is allowed to send nothing but a signaling to the called terminal.

Strategy 3. The strategy is also adopted in the situation where the called terminal has subscribed to the HLR for the customized information service, agreeing with the HLR that, while sending the customized information the called terminal should send a notification to the VMSC indicating that the information is a piece of customized information by means of, for example, attaching a special identity to the customized information; upon receiving the notification, the VMSC forwards the notification to the charging unit which initiates a customized information charging mode upon receiving the notification until the VMSC notifies the charging unit to start charging for the conversation when a called response from the called terminal is received by the VMSC.

The customized information charging mode may feature a lower charging rate for the customized information than for a common voice conversation.

The foregoing description is only preferred embodiments of the present invention, and is not used for limiting the invention. Any modification, equivalent replacement or improvement made under the spirit and principles of the present invention should be covered within the protection scope of this invention.

What is claimed is:

1. An apparatus for providing customized information, wherein, the customized information is provided by a called terminal to a caller terminal, the called terminal has subscribed to a Home Location Register (HLR), to both a customized information service and a Ring Back Tone (RBT) service, and the apparatus comprises:
    a control unit being used for determining, upon receiving a call request from the caller terminal, a customized information selection parameter of the called terminal and whether a customized information transmission condition is met according to a customized information transmission condition stored in the called terminal; the customized information transmission condition comprising at least one of: a caller terminal identity, period of calling time, and location of the called terminal during the calling;
    a play unit being used for sending a notification to a Visited Mobile Switching Center (VMSC) indicating that the called terminal will send the customized information to the caller terminal so that the VMSC forwards the notification to a Mobile Switching Center (MSC) when the called terminal determines that the customized information transmission condition is met, and receiving a customized information identity from the control unit, requesting the customized information that corresponds to the customized information identity, and sending the customized information to the caller terminal; and
    an information storage unit being used for storing the customized information, and sending the customized information that corresponds to the customized information identity to the play unit according to the request from the play unit; and
    the play unit further being used for sending a notification to the VMSC indicating that the called terminal will not send the customized information to the caller terminal when the called terminal determines the customized information transmission condition is not met, so that the VMSC forwards the notification to an RBT server (RBTS), via the MSC, and the RBTS sends the RBT customized by the called terminal to the caller terminal.

2. The apparatus according to claim 1, further comprising:
    a format conversion unit, for receiving the customized information inputted externally, converting format of the customized information inputted externally into a designated transmission format, and sending customized information converted to the information storage unit.

3. The apparatus according to claim 1, wherein the control unit is further used for sending a stop playing signal to the play unit when detecting that a called user answers; and
    the play unit terminates a process of sending the customized information to the caller terminal upon receiving the stop playing signal.

4. The apparatus according to claim 1, wherein the control unit is further used for sending a customized information identity which is set to be a background sound to the play unit when detecting that a called user answers, or sending both the customized information identity which is set to be the background sound and a play-for-the-called signal to the play unit; and
    the play unit is further used for obtaining the customized information that corresponds to the customized information identity from the information storage unit and sending the customized information to the caller terminal, upon receiving the customized information identity; and upon receiving the play-for-the-called signal, sending the customized information to a speaker of the called terminal.

5. The apparatus according to claim 1, wherein the control unit is further used for storing a sound effect parameter adjustment condition and a standard sound effect parameter and sending the standard sound effect parameter to the play unit upon detecting that the sound effect parameter adjustment condition is met; and
    the play unit is further used for adjusting the customized information sent according to the sound effect parameter, upon receiving the standard sound effect parameter.

6. The apparatus according to claim 1, further comprising:
    a charging unit being used for charging the customized information according to the customized information identity, and charging for a call upon receiving a call response from the called terminal.

7. A method for providing customized information, wherein, the customized information is provided by a called terminal to a caller terminal, the called terminal has subscribed to a Home Location Register (HLR), to both a customized information service and a Ring Back Tone (RBT) service, and the method comprises:
    receiving, by the called terminal, a call request from the caller terminal to the called terminal;
    determining, by the called terminal, whether a customized information transmission condition is met according to the customized information transmission condition stored in the called terminal; the customized information transmission condition comprising at least one of: a caller terminal identity, period of calling time, and location of the called terminal during calling;
    sending, by the called terminal, a notification to a Visited Mobile Switching Center (VMSC) indicating that the called terminal will send the customized information to the caller terminal so that the VMSC forwards the notification to a Mobile Switching Center (MSC) when the called terminal determines that the customized information transmission condition is met; sending, by the called terminal, the customized information stored in the called terminal to the caller terminal; and
    sending, by the called terminal, a notification to the VMSC indicating that the called terminal will not send the customized information to the caller terminal, so that the VMSC forwards the notification to an RBT server (RBTS), via the MSC, and the RBTS sends the RBT customized by the called terminal to the caller terminal.

8. The method according to claim 7, wherein the customized information comprises at least one of voice information, video information and graphic information.

9. The method according to claim 7, wherein sending the customized information to the caller terminal comprises:
sending the customized information to the caller terminal via a path that supports a customized information transmission from the called terminal to the caller terminal.

10. The method according to claim 7, further comprising:
setting the called terminal in an automatic connected state; and
sending the customized information to the caller terminal comprising:
sending the customized information to the caller terminal via a bidirectional communication link between the called terminal and the caller terminal.

11. The method according to claim 7, further comprising:
terminating a process of sending the customized information to the caller terminal upon the called terminal detecting that a called user answers.

12. The method according to claim 7, further comprising:
sending the customized information which is set to be a background sound to the caller terminal or the called terminal until the called terminal detects that a called user answers.

13. The method according to claim 7, wherein the called terminal stores a sound effect adjustment condition and a standard sound effect parameter, the method further comprising:
adjusting the customized information sent according to the sound effect parameter stored in the called terminal, upon the called terminal detects that the sound effect parameter adjustment condition is met.

14. The method according to claim 7, wherein the customized information selection parameter comprises at least one of a caller terminal identity, period of calling time and location of the called terminal during the calling.

15. The method according to claim 7, wherein sending the customized information to the caller terminal comprises:
sending the customized information and the customized information identity to the VMSC through the MSC;
sending the customized information to the caller terminal, notifying a charging unit to charge for the customized information according to the customized information identity and to charge for a call upon receiving a call response from the called terminal.

16. The method according to claim 7, further comprising:
subscribing for call wait services other than the customized information service as well as the customized information service at the same time to the HLR by the called terminal, setting and storing a customized information transmission condition by the called terminal;
sending the customized information to the caller terminal comprising:
sending the customized information to the caller terminal when the called terminal detects that the customized information transmission condition is met.

17. The method according to claim 16, wherein the customized information transmission condition comprises at least one of a designated caller terminal identity, a designated period of time and a designated location of the called terminal.

18. The method according to claim 7, further comprising:
notifying the MSC that the called terminal sends the customized information to the caller terminal.

19. A method for providing customized information, wherein, the customized information is provided by a called terminal to a caller terminal, and the called terminal has not subscribed to a Home Location Register (HLR), to either a customized information service or a Ring Back Tone (RBT) service, the method comprising:
receiving, by the called terminal, a call request from a caller terminal;
obtaining, by the called terminal, customized information stored in the called terminal in response to the call request;
upon receiving the call request, notifying, by the called terminal, a Mobile Switching Center that the called terminal will send the customized information to the caller terminal; and
sending the customized information to the caller terminal.

20. The method according to claim 19, wherein obtaining the customized information stored in the called terminal further comprises:
determining a customized information selection parameter;
searching for a customized information identity corresponding to the customized information selection parameter according to a relationship between the customized information selection parameter and the customized information identity, wherein the relationship is stored in the called terminal; and
obtaining the customized information corresponding to the customized information identity.

21. The method according to claim 20, wherein the customized information selection parameter comprises at least one of a caller terminal identity, period of calling time and location of the called terminal during the calling.

* * * * *